United States Patent
Busser et al.

(10) Patent No.: US 12,228,659 B2
(45) Date of Patent: Feb. 18, 2025

(54) ANGLE OF ARRIVAL OF WIRELESS LOCAL AREA NETWORK DEVICES USING A SWITCHED BEAM ANTENNA

(71) Applicant: SR Technologies, Inc., Sunrise, FL (US)

(72) Inventors: Ryan Busser, Fort Lauderdale, FL (US); Graham K. Smith, Boca Raton, FL (US); Mark Passler, Boca Raton, FL (US); Phillip Louis Roccapriore, Fort Lauderdale, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 18/770,468

(22) Filed: Jul. 11, 2024

(65) Prior Publication Data

US 2024/0361416 A1    Oct. 31, 2024

Related U.S. Application Data

(63) Continuation of application No. 18/583,272, filed on Feb. 21, 2024, now Pat. No. 12,066,555.

(60) Provisional application No. 63/491,649, filed on Mar. 22, 2023.

(51) Int. Cl.
*G01S 3/04*    (2006.01)

(52) U.S. Cl.
CPC .................. *G01S 3/043* (2013.01)

(58) Field of Classification Search
CPC .................................................. G01S 3/043
USPC .................... 342/317, 445, 455; 455/456.1
See application file for complete search history.

(56) References Cited

U.S. PATENT DOCUMENTS

| | | | | |
|---|---|---|---|---|
| 9,516,395 B2* | 12/2016 | Foster, III | ............... | H04Q 9/04 |
| 10,267,769 B2* | 4/2019 | Otter | ................... | G01N 29/024 |
| 2022/0137177 A1* | 5/2022 | Hammerschmidt | .. | G01S 13/003 |
| | | | | 455/456.1 |
| 2023/0319773 A1* | 10/2023 | Ying | .................... | H04W 64/00 |
| | | | | 455/456.1 |

* cited by examiner

*Primary Examiner* — Bo Fan
(74) *Attorney, Agent, or Firm* — Goodwin Procter LLP

(57) ABSTRACT

A method and apparatus for measuring the angle of arrival AOA of Wi-Fi packets, using a switched beam antenna SBA is described. Wide antenna beams, quadrants, are selected in turn and a burst of packets is transmitted on each quadrant. The quadrant with the highest average signals strength is selected. Then the narrow antenna beams that make up that selected quadrant are selected, in sequence, and the average signal strength for each narrow beam is recorded. The narrow beam with the highest average signal strength is returned as the AOA. Based upon which narrow beam recorded the highest signal strength, the next sequence of antenna beams is selected. When the SBA is mounted on a mobile platform, the parameters of the transmission bursts are chosen such that the angular error due to cornering of the platform is negligible.

20 Claims, 16 Drawing Sheets

ANGLE OF ARRIVAL OF WIRELESS LOCAL AREA NETWORK DEVICES USING A SWITCHED BEAM ANTENNA

CROSS-REFERENCE TO RELATED APPLICATION

This application is a continuation of U.S. patent application Ser. No. 18/583,272, filed Feb. 21, 2024, entitled ANGLE OF ARRIVAL OF WIRELESS LOCAL AREA NETWORK DEVICES USING A SWITCHED BEAM ANTENNA, which claims priority to U.S. Provisional Patent Application Ser. No. 63/491,649, filed Mar. 22, 2023, entitled ANGLE OF ARRIVAL OF WIRELESS LOCAL AREA NETWORK DEVICES USING A SWITCHED BEAM ANTENNA, the entire contents of each of which are hereby incorporated by reference.

TECHNICAL FIELD

The present disclosure relates to geo-location of wireless devices, and in particular to a method, device and system for the measurement of angle of arrival (AOA) of wireless local area network (WLAN) devices.

BACKGROUND

Initially, it is noted that Institute of Electrical and Electronics Engineers (IEEE) Standard 802.11-2020 is used as the base reference for disclosures used herein, the entire contents of which are incorporated herein by reference. The IEEE 802.11-2020 Standard is commonly referred to as "Wi-Fi" and is referred to as such herein. A Wi-Fi station is referred herein as a STA.

Angle of arrival (AOA) of a signal is the direction from which the signal is received. The AOA of the signals received by STA A from STA B will be the direction of STA B relative to STA A. STA A may transmit signals to STA B in order to stimulate STA B to transmit response signals back to STA A such that STA A may measure the AOA.

FIG. 1 is a diagram that describes a method that may be used to communicate between two wireless devices, such as wireless device STA A 100 and wireless device STA B 105. Time axis 110 refers to the time axis for STA A 100 and time axis 120 refers to the time axis for STA B 105. At time T1 111, STA A 100 transmits a packet 112 to STA B 105. Packet 112 is received at STA B 105 at time T2 113. STA B 105 then transmits a response packet 124 at time T3 123 after a turnaround time 122. At time T4 114, STA A 100 receives the response packet 124 from STA B 105. Examples of packet 112 include a "request to send" (RTS), or a data null. The corresponding response packets 124 are then "clear to send" (CTS) or acknowledgement (Ack).

FIG. 2 is a diagram that describes in further detail the communication between STA A 100 and STA B 105. Time axis 210 is the time axis for STA A 100 and time axis 220 is the time axis for STA B 105. At time Ta 211, STA A 200 starts the transmission of ranging packet 112 which is addressed to STA B 105. At time Tb 222, STA B 105 completes the reception of packet 112. STA B 105 then transmits the response packet 124 at time Tc 223, a time $T_{SIFS}$ 232 after time Tb 222, where $T_{SIFS}$ is the short interframe space as defined in the Standard. At time Td 214, STA A 100 completes receiving the response packet 124. Another packet 112 may be transmitted by STA A 100 to STA B 105 at a time Tp 230 after time Ta 211.

As mentioned previously, the packet exchange may be any pair of packets where an automatic response packet is sent. Commonly used packets in Wi-Fi include an RTS/CTS exchange and a Data (null)/Ack exchange.

The angle of arrival AOA of a signal may be measured using a switched beam antenna, SBA. By selecting individual antennas, or groups of antennas, an SBA may be configured to be a directional antenna of variable beamwidths. The basic objective is to select the narrowest beam that is pointing in the direction of the target, thus providing an AOA. In order to measure AOAs in an accurate and timely fashion, the relative timing of the transmissions and receptions of packets 112 and 124 need to be aligned with the timings of the selections of the antenna combinations of the SBA.

SUMMARY

A method and wireless device (WD) configured for the measurement of angle of arrival (AOA) of wireless local area network (WLAN) devices are disclosed.

According to one aspect, a method is provided in a first wireless device (WD) configured with a switched beam antenna (SBA), for determining an angle of arrival (AOA) corresponding to communication between the first WD and a second WD. The method includes transmitting successive bursts of ranging packets, a number of ranging packets in a burst of ranging packets, a time between ranging packets in the burst and a gap between successive bursts being selected based at least in part on a first limit on an angular error of a determination of an AOA of a selected beam. The method also includes receiving, in succession, a first burst of response packets in each beam of a first set of beams, the first burst of response packets being transmitted by the second WD in response to a first burst of ranging packets. The method further includes determining a first beam of the first set of beams associated with a highest average received signal strength of the first bursts of response packets. The method also includes receiving, in succession, a second burst of response packets in each beam of a second set of beams, the second burst of response packets being transmitted by the second WD in response to a second burst of ranging packets, each beam of the second set of beams being narrower than the determined first beam and being directed within an angular sector of the determined first beam. The method further includes selecting the selected beam from the second set of beams, the selected beam being associated with a highest average received signal strength of the second bursts of response packets. The method also includes determining an AOA of the selected beam.

According to this aspect, in some embodiments, the number of ranging packets in the burst of ranging packets, the time between ranging packets in the burst and the gap between successive bursts of ranging packets are selected further based on a second limit on an error in determining a highest average received signal strength of a burst of response packets. In some embodiments, receiving, in succession, a second burst of response packets in each beam of the second set of beams includes: receiving, in succession, a burst of response packets in each beam of a first subset of the second set of beams; and receiving, in succession, a burst of response packets in each of at least one beam of a second subset of the second set of beams, the at least one beam of the second subset being offset in direction from a direction of a beam of the first subset. In some embodiments, the offset in direction is selected based at least in part on the limit on an angular error in determining the AOA of the selected beam. In some embodiments, the first subset of the second set of beams are directed in a first set of directions within the angular sector and the offset in direction is selected to be in a direction of increasing average received signal strength as determined based at least in part on average received signal strengths associated with beams of the first subset of the second set of beams. In some embodiments, the first subset of the second set of beams are associated with a first set of antennas of the first WD and the second subset of the second set of beams are associated with a subset of the first set of antennas. In some embodiments, a direction of each beam of a subset of the second set of beams is successively incremented in an angular direction, until an average received signal strength of an associated beam of the subset exceeds a threshold. In some embodiments, an average received signal strength is based at least in part on a correlation of a received response packet with a known sequence. In some embodiments, the first WD is positionable on a vehicle and the first WD is configured to select the number of ranging packets in a burst of ranging packets, the time between ranging packets in the burst and the gap between successive bursts based at least in part on a velocity of the vehicle. In some embodiments, a time between ranging packets in the burst and a gap between successive bursts is selected based at least in part on a limit on angular error of a determination of an AOA of a selected beam. In some embodiments, the limit on angular error is less than half a beam selection accuracy of the SBA.

According to another aspect, a first wireless device (WD) configured with a switched beam antenna (SBA), for determining an angle of arrival (AOA) corresponding to communication between the first WD and a second WD is provided. The first WD includes an RF transmitter configured to transmit successive bursts of ranging packets, a number of ranging packets in a burst of ranging packets, a time between ranging packets in the burst and a gap between successive bursts being selected based at least in part on a first limit on an angular error of a determination of an AOA of a selected beam. The first WD includes an RF receiver in communication with the SBA and configured to receive, in succession, a first burst of response packets in each beam of a first set of beams, the first burst of response packets being transmitted by the second WD in response to a first burst of ranging packets. The first WD also includes processing circuitry in communication with the RF receiver and configured to determine a first beam of the first set of beams associated with a highest average received signal strength of the first bursts of response packets. The RF receiver is further configured to receive, in succession, a second burst of response packets in each beam of a second set of beams, the second burst of response packets being transmitted by the second WD in response to a second burst of ranging packets, each beam of the second set of beams being narrower than the determined first beam and being directed within an angular sector of the determined first beam. The processing circuitry is further configured to select the selected beam from the second set of beams, the selected beam being associated with a highest average received signal strength of the second bursts of response packets and determine an AOA of the selected beam.

According to this aspect, in some embodiments, the number of ranging packets in the burst of ranging packets, the time between ranging packets in the burst and the gap between successive bursts of ranging packets are selected further based on a second limit on an error in determining a highest average received signal strength of a burst of response packets. In some embodiments, receiving, in succession, a second burst of response packets in each beam of the second set of beams includes: receiving, in succession, a burst of response packets in each beam of a first subset of the second set of beams; and receiving, in succession, a burst of response packets in each of at least one beam of a second subset of the second set of beams, the at least one beam of the second subset being offset in direction from a direction of a beam of the first subset. In some embodiments, the offset in direction is selected based at least in part on the limit on an angular error in determining the AOA of the selected beam. In some embodiments, the first subset of the second set of beams are directed in a first set of directions within the angular sector and the offset in direction is selected to be in a direction of increasing average received signal strength as determined based at least in part on average received signal strengths associated with beams of the first subset of the second set of beams. In some embodiments, the first subset of the second set of beams are associated with a first set of antennas of the first WD and the second subset of the second set of beams are associated with a subset of the first set of antennas. In some embodiments, a direction of each beam of a subset of the second set of beams is successively incremented in an angular direction, until an average received signal strength of an associated beam of the subset exceeds a threshold. In some embodiments, an average received signal strength is based at least in part on a correlation of a received response packet with a known sequence. In some embodiments, the first WD is positionable on a vehicle and the first WD is configured to select the number of ranging packets in a burst of ranging packets, the time between ranging packets in the burst and the gap between successive bursts based at least in part on a velocity of the vehicle. In some embodiments, a time between ranging packets in the burst and a gap between successive bursts is selected based at least in part on a limit on angular error of a determination of an AOA of a selected beam. In some embodiments, the limit on angular error is less than half a beam selection accuracy of the SBA.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

A method and apparatus are disclosed that measures the AOA of signals received from a Wi-Fi device using an SBA.

Figure 3:
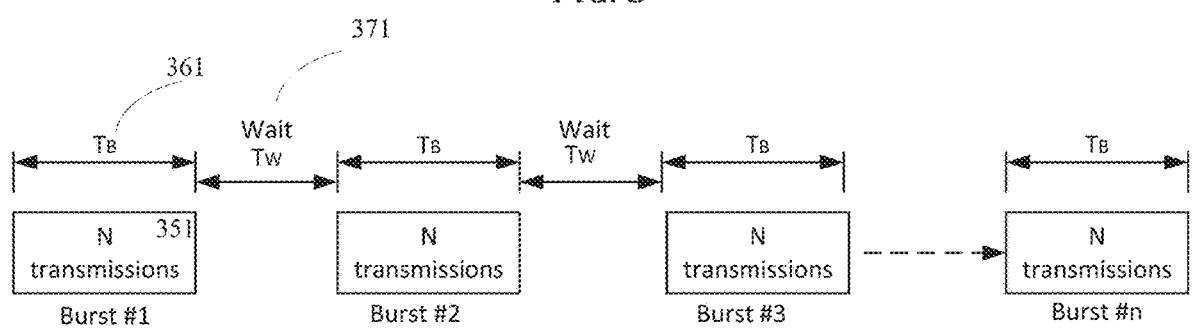
FIG. 3 is a timing diagram of a series of bursts of transmissions of the ranging packets.

FIG. 3 is a timing diagram of a series of bursts of transmissions of the ranging packets 212. In one embodiment of this disclosure, a "burst", 351, consisting of a preset number N of transmissions of packets 212 from STA A 100, may be sent followed by a "wait" period, 371. This sequence may continue until a command may be issued to terminate the transmissions. Within each burst, each of the N transmissions may be separated by a preset time, Tp 230. The duration TB 361 of each burst will therefore be N Tp. For example, a burst may consist of 128 or 64 transmissions of packets 212 from STA A 100. Each transmission may be, for example, 1 ms apart, followed by a wait period of, for example, 20 or 30 ms after which another burst of 128 or 64 transmissions may be sent. In these examples, the duration of each burst will be either 128 ms or 64 ms and burst plus wait time will be 148 ms or 94 ms. Note that STA A 100 may be a first wireless device (WD) and the STA B 105 may be a second WD.

The angle of arrival AOA of a signal may be measured using a switched beam antenna, SBA. A more complete understanding of the present embodiments, and the attendant advantages and features thereof, will be more readily understood by first describing the basics of an example SBA.

Figure 4:
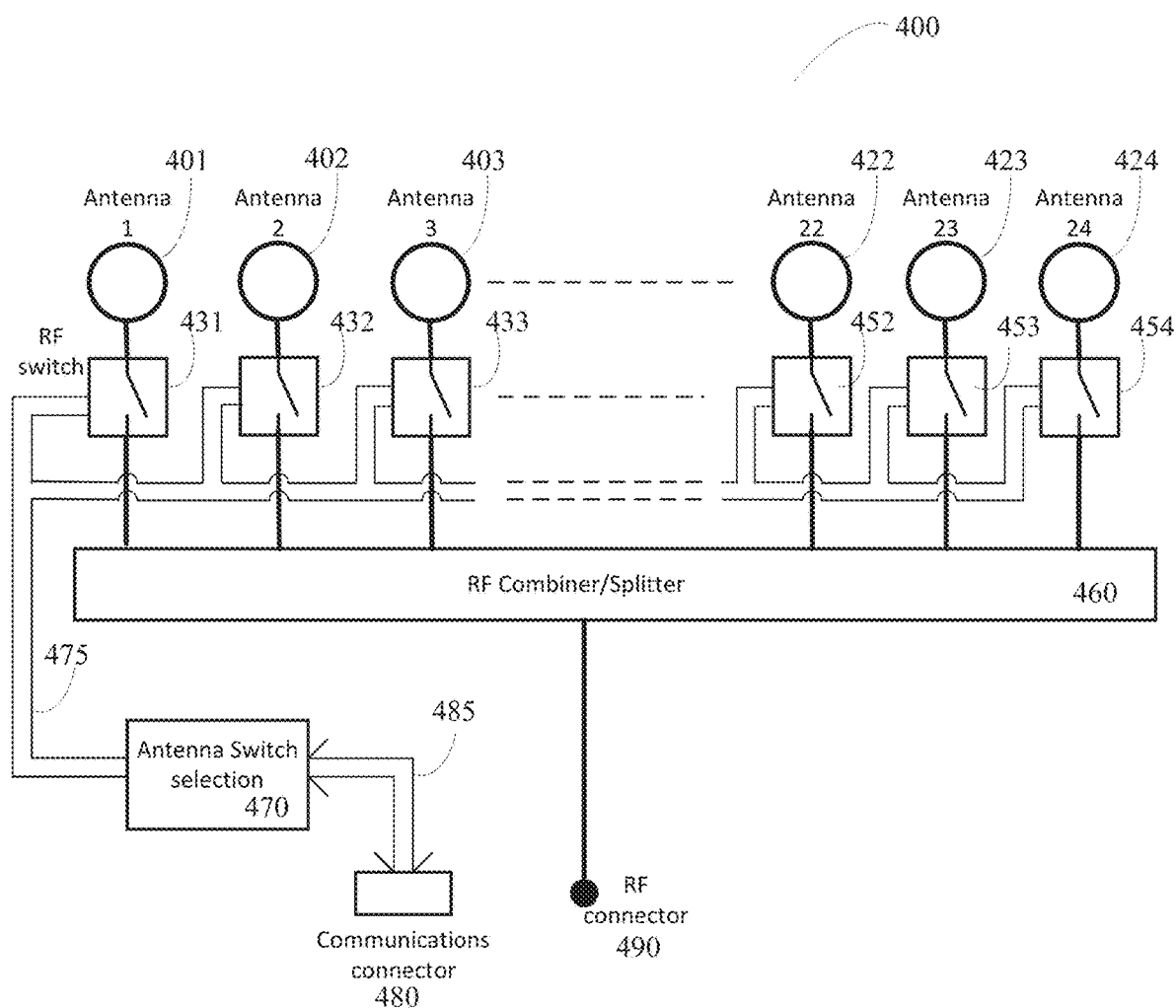
FIG. 4 is a block schematic diagram of an example of a switched beam antenna (SBA)

FIG. 4 is a block schematic diagram of an example of an SBA 400. In this example, SBA 400 comprises 24 antennas 401 to 424. Each antenna 401 to 424 may be either an individual antenna or, in some SBA examples, an antenna array. Each antenna 401 to 424 is connected to a radio frequency, RF, switch 431 to 454 respectively. The RF switches 431 to 454 are connected to an RF combiner/splitter 460 which is connected to a single RF connector 490. The RF switches 431 to 454 are controlled by the antenna switch selection module 470 over a data bus 475. External commands are sent via the communications connector 480 which is connected to the antenna switch selection module 470 via data bus 485. External commands sent via communication connector 480 may cause one or more antennas 401 to 424 to be selected by causing the respective RF switch(es) 431 to 454 to be selected. For example, different commands may be used to either cause a single antenna to be selected, or a number of antennas to be selected so as to form beams with various beamwidths. As used herein, a "wide beam" may be a beam having a width of about 90 degrees, while a "narrow beam" as used herein may be a beam having width of less than that of a wide beam.

Figure 5:
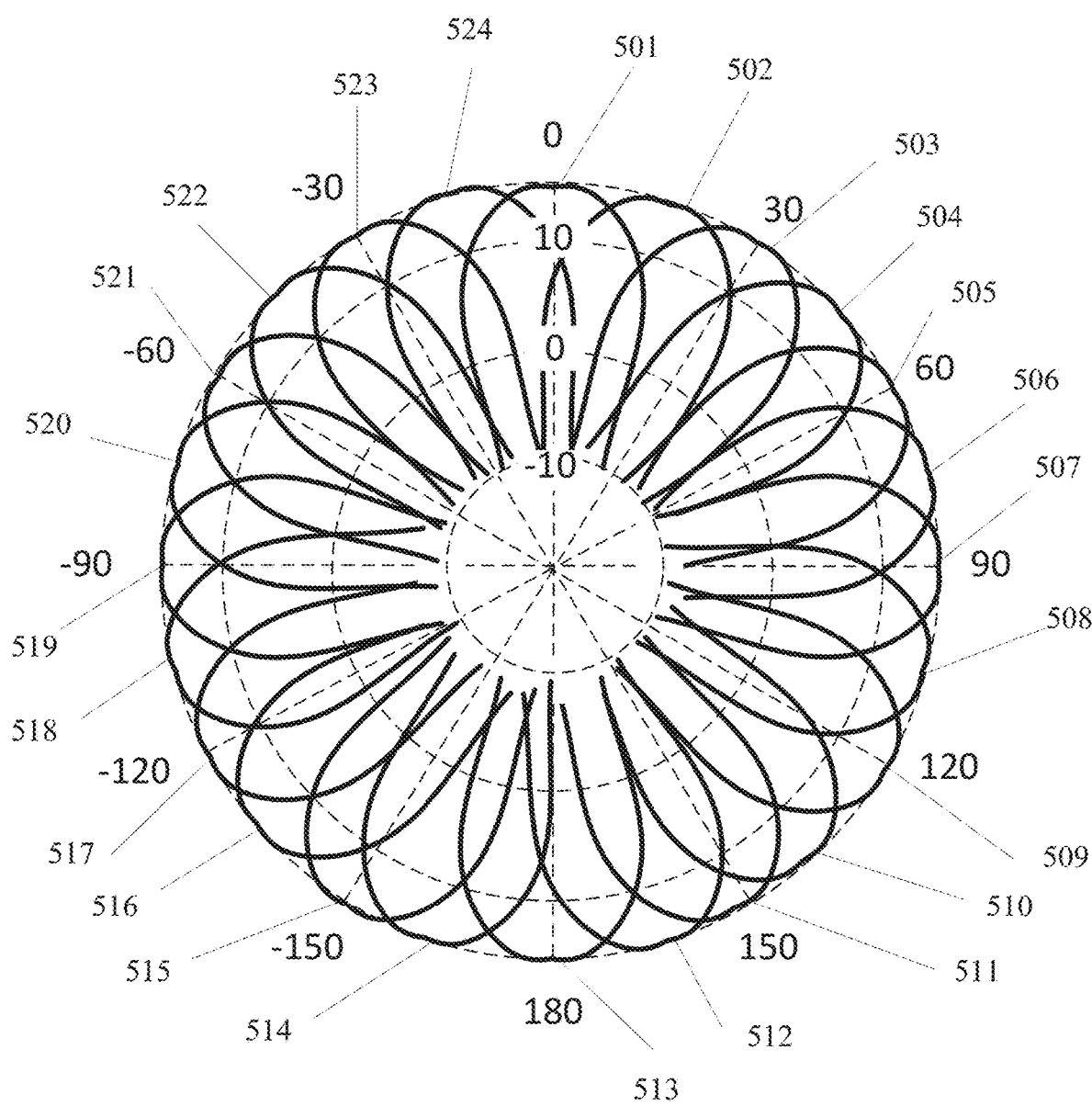
FIG. 5 is a diagram of an example the 24 individual beams corresponding to antennas when arranged in a circle, each beam at 15 degrees intervals.
Figure 6:
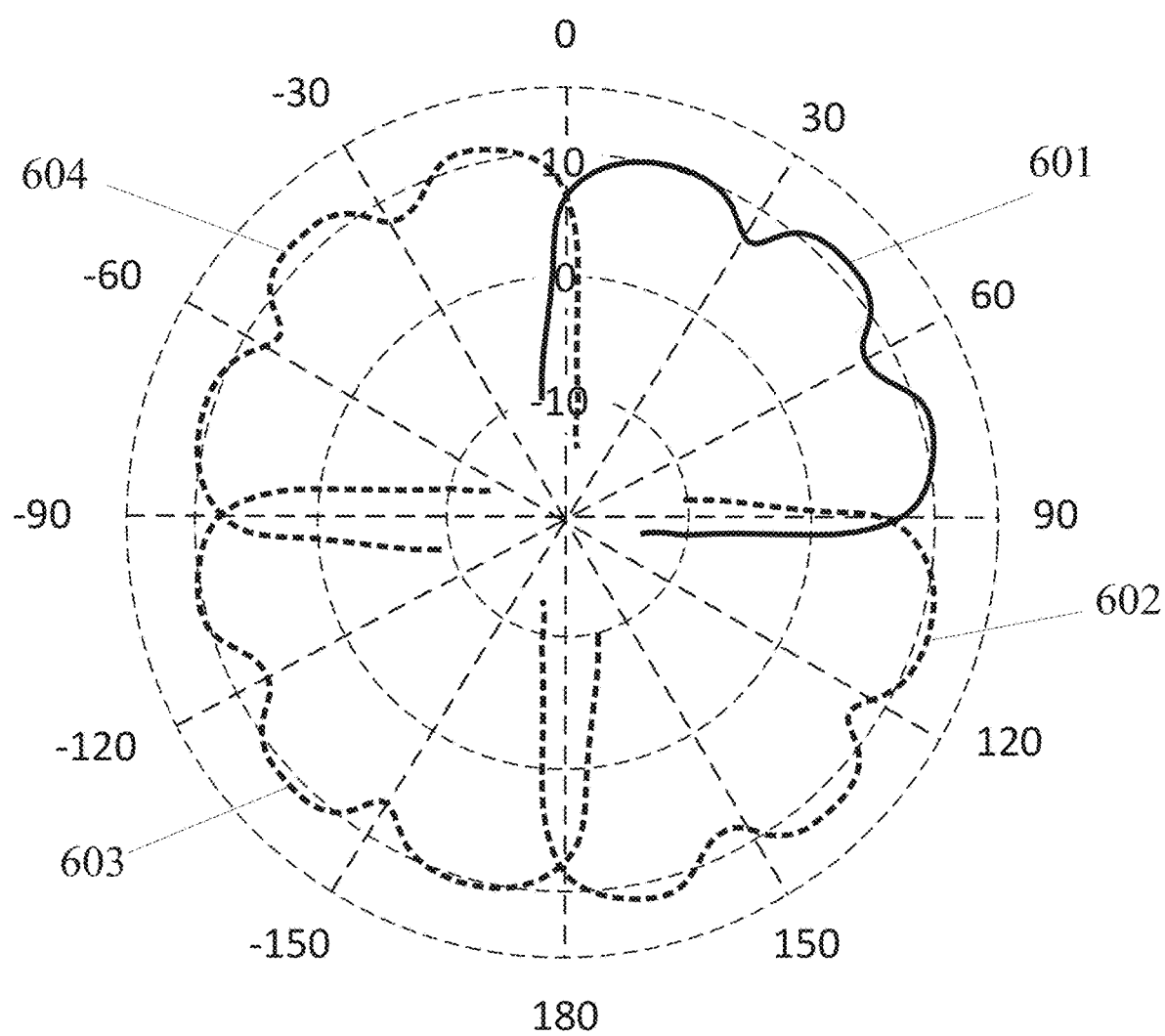
FIG. 6 is a diagram of an example of a beam resulting from the selection of antennas producing a wide beam of about 90 degrees width at a relative angle of 45 degrees.

FIG. 5 is a diagram of an example of the 24 individual beams 501 to 524 corresponding to antennas 401 to 424 when arranged in a circle, each beam at 15 degrees intervals. By inputting the appropriate command at communications connector 480, any of the 24 individual beams may be selected. Also, by inputting other commands at communications connector 480, a group of antennas may be selected. FIG. 6 is a diagram of an example of a beam 601 resulting from the selection of antennas 402, 404 and 406, producing a beam of about 90 degrees width at a relative angle of 45 degrees. Hence, beam 601 may be referred to as "quadrant 601". Similarly other 90-degree beams, or quadrants, 602, 603 and 604 may be produced at relative angles of 135, −135 and −45 degrees, by selecting the appropriate antennas. For example, beam 602 is produced by selecting antennas 408, 410 and 412; beam 603 is produced by selecting antennas 414, 416 and 418; beam 604 is produced by selecting antennas 420, 422 and 424.

In one embodiment, STA A 100 is located on a mobile platform and STA B 105 is in a fixed location. In another embodiment, STA A 100, is located in a fixed location and STA B 105 is mobile. In yet another embodiment, both STA A 100, and STA B 105 are mobile.

Figure 7:
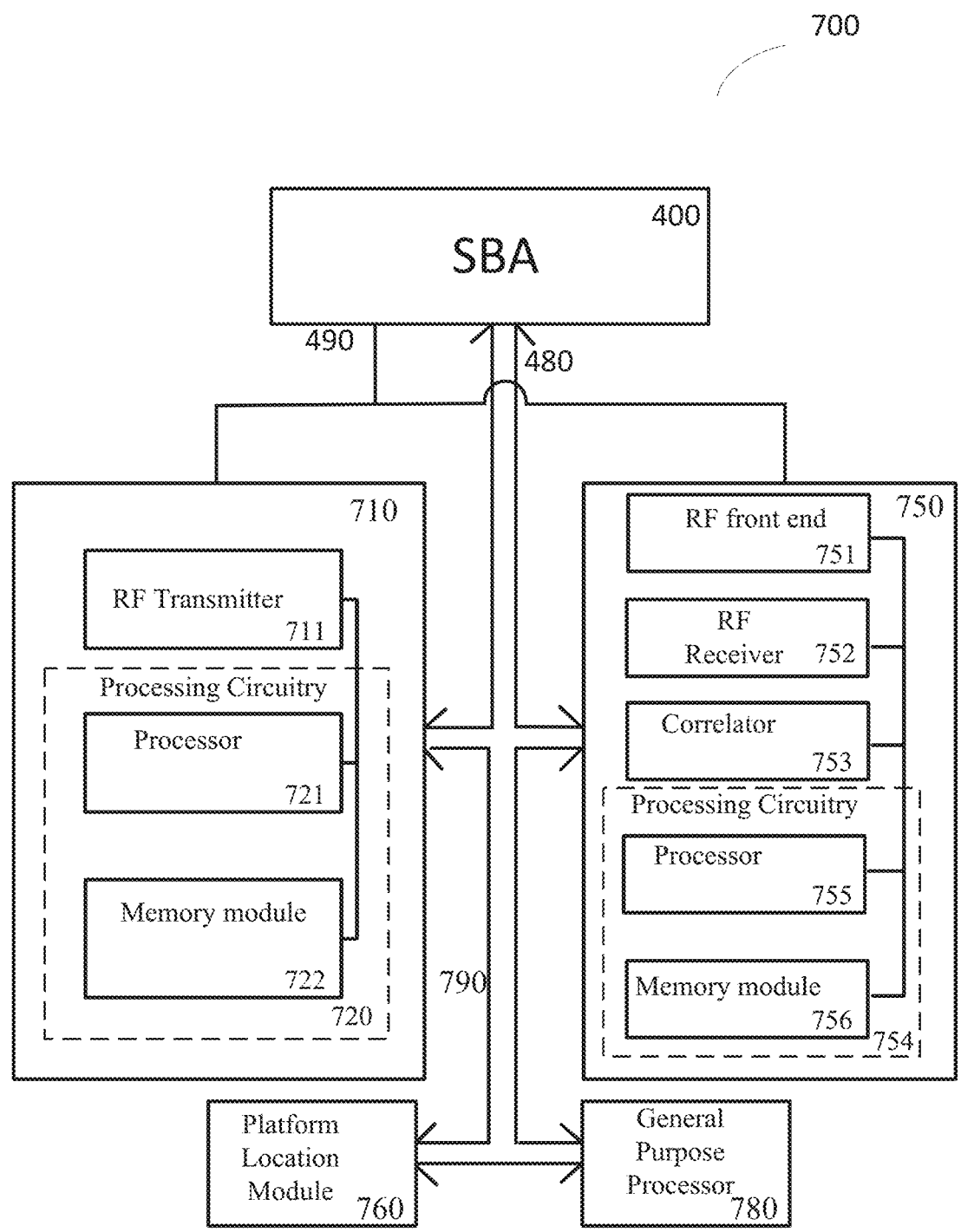
FIG. 7 illustrates a block diagram of an example wireless communication device which, according to an embodiment of the disclosure, may be used as or as part of the wireless device STA A.

FIG. 7 illustrates a block diagram of an example wireless communication device 700 which, according to an embodiment of the disclosure, may be used as or as part of the wireless device STA A 100. The wireless communication device 700 may be any device capable of wirelessly receiving signals and transmitting signals and may be configured to execute any of the methods of the IEEE 802.11-2020 Standard. Wireless communication device 700 may be one or more stations or access points, and the like. Wireless communication device 700 may be one or more wireless devices that are based upon the IEEE 802.11-2020 specification and each may be configured to act as a transmitter or a receiver. The embodiment described herein is that where wireless communication device 700 includes an SBA 400, wireless transmitter 710 and a wireless receiver 750. The wireless communication device 700 may also include a platform location module 760 and a general purpose processor 780 which are interconnected to the wireless transmitter 710, the wireless receiver 750 and the SBA 400 by a data bus 790. In some embodiments the connection to the SBA 400 via communications connector 480 may be via a separate data bus from the processing circuitry that is used to control the SBA 400, i.e., processing circuitry 720 or 754 or the general purpose processor 780.

In some embodiments, wireless transmitter 710 includes an RF transmitter 711 and processing circuitry 720 that includes processor 721, and memory module 722. RF transmitter 711 may perform the functions of modulation, as described in IEEE 802.11-2020 and amplification for the transmission of the Wi-Fi packets via RF connector 480 and SBA 400. In some embodiments processing circuitry 720 and/or processor 721 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of RF transmitter 711 may be performed by processing circuitry 720. Processing circuitry 720 may be configured to control any of the methods and/or processes described herein and/or to cause such methods, and/or processes to be performed, e.g., by RF transmitter 711. Memory module 722 may be configured to store data, programmatic software code and/or other information described herein. In some embodiments, the software may include instructions that, when executed by processing circuitry 720, causes processing circuitry 720 to perform the processes described herein with respect to wireless transmitter 710.

In some embodiments, wireless receiver 750 includes an RF front end 751, an RF receiver 752, a correlator 753, processing circuitry 754 (that includes a processor 755 and a memory module 756. RF front end 751 may perform the usual functions of an RF receiver front end such as low noise amplification, filtering and frequency down conversion so as to condition the received signal suitable for inputting to RF receiver 752. RF receiver 752 may perform the functions of demodulation of the Wi-Fi packet. In some embodiments and as described in U.S. Pat. Nos. 10,812,132 and 10,840,970, RF receiver 752 may condition the received signal suitable for inputting to correlator 753. If present, correlator 753 performs the function of correlating the conditioned, demodulated received bits with the known bit pattern. As disclosed in U.S. Pat. Nos. 10,812,132 and 10,840,970 and Published U.S. Patent Application Nos. 2022/0078743, 2022/0110087 and 2022/0196825, correlator 753 may comprise different circuitry dependent, in part, upon the modulation. When a correlation is used, the effective receiver sensitivity of the Wi-Fi packets may be significantly improved. As discussed below with reference to FIGS. 5, 6, 8, 9 and 10, the signal strengths of the received signals on the selected antennas of the SBA 400 are used to select the best antenna. If the received signal is too low for conventional reception then the correlation may still indicate reception. In this case, the correlation value may be converted into an equivalent received signal strength. Hence, the term "signal strength" should be understood to include its correlation value equivalent.

In some embodiments RF receiver 752 and/or correlator 753 and/or processing circuitry 754 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of RF receiver 752 and/or correlator 753 may be performed by processing circuitry 754. Processing circuitry 754 may be configured to control any of the methods and/or processes described herein and/or to cause such methods, and/or processes to be performed, e.g., by wireless receiver 750. Memory module 756 is configured to store data, programmatic software code and/or other information described herein. In some embodiments, the software may include instructions that, when executed by processing circuitry 754, causes processing circuitry 754 to perform the processes described herein with respect to wireless receiver 750.

According to this embodiment of the disclosure, wireless receiver 750 may be configured to measure and monitor an input signal's attribute, such as may include one or more of a signal transmitted by wireless transmitter 710, data and control packets, and the response signal, including control packets, transmitted by an access point or station that may be based upon the IEEE 802.11-2020 Standard. Such packets may include data null, ACK, RTS and CTS packets. Memory module 756 may store instructions for executing any method mentioned in the IEEE 802.11-2020 Standard, input signals, and results of processing of processor 755, signals to be outputted and the like. Processing circuitry 754 may output to general purpose processor 780 attributes of the received packets 124 such as signal strength together with the antenna beam that was selected in the SBA 400.

According to an embodiment of the disclosure, RF transmitter 711 may be configured to transmit signals and processing circuitry 720 may be configured to prepare the transmitted signal attributes based upon the IEEE 802.11-2020 Standard. Such transmitted packets may include data packets, control packets and management packets. Such control packets may include RTS packets. Memory module 722 may store instructions for executing any method mentioned in the specification, input signals, and results of processing of processor 721, signals to be outputted and the like.

According to another embodiment of the disclosure, wireless receiver 750 may be configured to receive the transmissions of another target, wireless communication device, e.g., STA B 105, and processing circuitry 754 may be configured to monitor an attribute of the transmissions of the other wireless communication device, and determine the value of the signal strengths of packets from the other wireless communication device.

According to an embodiment of the disclosure, wireless transmitter 710 may be configured to transmit bursts 351 of packets to another wireless communication device, as described in FIG. 3, and processor 721 may be configured to prepare the attributes of the packet 112 to be transmitted. Processor 721 may also be configured to set the timing Tp 230 between each packet 112 transmission, the number N of packet 112 transmissions within each burst, the wait time Tw 371 between bursts, as well as the start and stop times for the sequence of bursts. During the wait time Tw 371, processor 721 may also be configured to set the antenna switches 431 to 454 in the SBA 400 so as to select an antenna beam for the next burst of transmissions.

According to an embodiment of the disclosure, general purpose processor 780 may be used to control the operations of wireless communication device 700 and, in particular, wireless transmitter 710 and wireless receiver 750. General purpose processor 780 may provide an interface to a user via a keyboard, mouse and display allowing a user to select the attributes of the target, STA B 105, control the start and stop of the transmissions 112 and interpret the resulting AOAs. General purpose processor 780 may also carry out the various calculations as described in this disclosure, such as determining a location for STA B 105 based upon the resulting AOAs, and may also prepare the measurement results for disclosure to an operator or user. In some embodiments general purpose processor 780 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions and may include a memory module to execute programmatic code stored in general purpose processor 780 or another device. It is also noted that the elements of wireless communication device 700 may be included in a single physical device/housing or may be distributed among several different physical devices/housings.

According to an embodiment of the disclosure, a platform location module 760 may be used to input, via the data bus 790, to general purpose processor 780 and/or processing circuitry 720 and/or 754 the location of the platform that is carrying wireless communication device 700. Platform location module 760 may comprise navigation equipment such as a GPS receiver and/or a gyro and may provide both the location and heading of wireless communication device 700 to general purpose processor 780, and processing circuitries 720 and 754. The location and heading of wireless communication device 700, together with the antenna selections of the SBA 400 may be used by general purpose processor 780 to calculate and display the location of the target, i.e., STA B 105. Geo-location of a device using AoAs and location of the wireless communication device is known.

A more complete understanding of the present embodiments, and the attendant advantages and features thereof, will be more readily understood by first describing the outline of a method of controlling SBA 400 antenna selection, the transmission of the bursts 351, receptions from the target, STA B 105, and the measurement of the received signals at the wireless communication device 700, STA A 100.

In order for STA A 100 to transmit a packet 112 and receive the corresponding response packet 124 from STA B 105 successfully, the SBA 400 antenna should be pointed in the general direction of STA B 105 from STA A 100. As discussed above with reference to FIGS. 4, 5 and 6, SBA 400 may be set to a selection of antenna beamwidths. A more complete understanding of the present embodiments, and the attendant advantages and features thereof, will be more readily understood by first describing an outline of an example method for the selection of SBA 400 antenna beam(s).

As discussed above with reference to FIG. 6, SBA 400 may be set to wide beams of about 90 degrees, i.e., "quadrants", e.g., quadrants 601, 602, 603 and 604. As an example, SBA 400 may initially be set to quadrant 601, and then STA A 100 sends a burst 351 of N transmissions of ranging packets 112. The average signal strength of the received response packets 124 across the burst is then noted. Quadrants 602, 603, and 604 may then be selected, in turn, and on each quadrant, STA A 100 sends a burst 351 of N transmissions of ranging packets 112 and the average signal strength of the received response packets 124 is noted. The quadrant corresponding to the highest average signal strength is then selected. The individual SBA 400 antennas, corresponding to that selected quadrant, may then be selected, in turn, and the corresponding received signal strengths noted for each antenna for each burst 351 of N transmissions of ranging packets 112. In the case that the received signal is too low for standard reception, then the additive correlation value may be used as the effective average signal strength. Additive correlation is described in the patents cited above.

Figure 8:
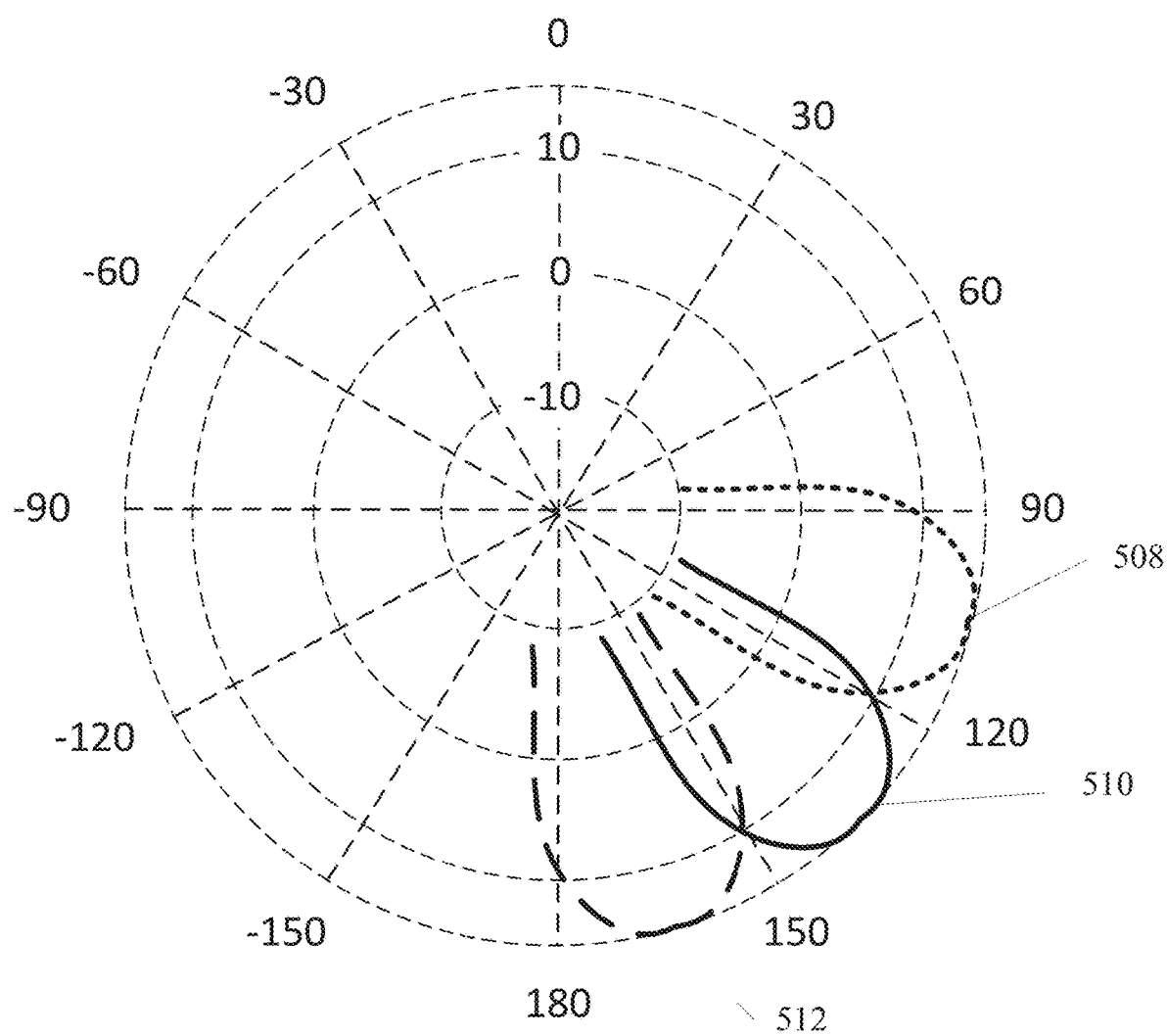
FIG. 8 is a diagram of an example of the three individual beams that correspond to the wide beam, quadrant.
Figure 9:
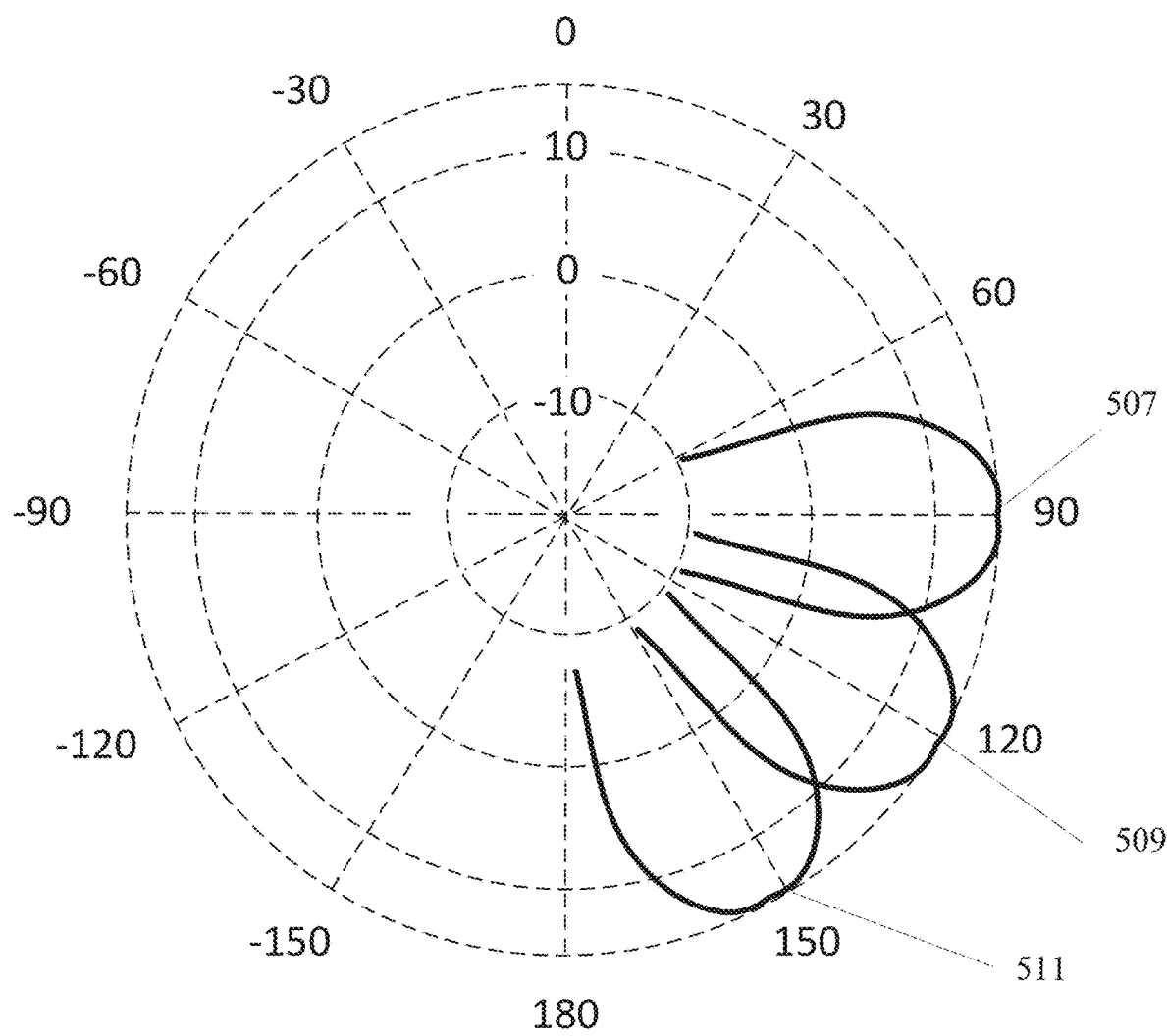
FIG. 9 is a diagram of an example of the three individual beams shifted −15 degrees.
Figure 10:
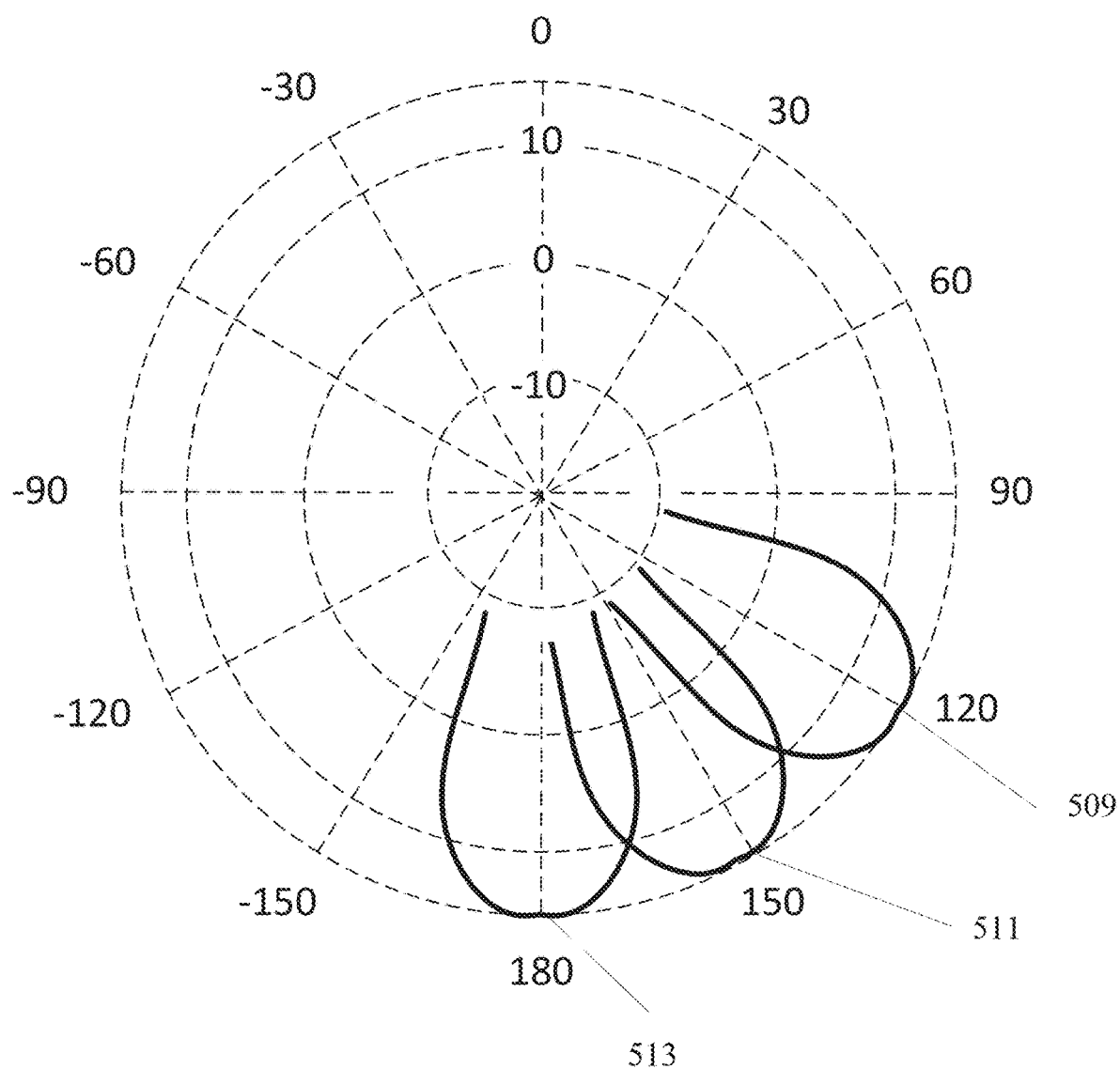
FIG. 10 is a diagram of an example of the three individual beams shifted +15 degrees.

FIG. 8 is a diagram of an example of the three individual beams, 508, 510 and 512 that correspond to the wide beam, quadrant 602. In this example, assume that the quadrant with the highest average signal strength is 602. Wireless communication device 700, acting as STA A 100, may then select, in turn, beams 508, 510, and 512, i.e., the beams that comprise quadrant 602 as discussed above with reference to FIG. 6, transmitting a burst 351 of N transmission 112 on each beam, and noting the average signal strength of the received packets 124 from STA B 105, per beam. After each sequence of sending bursts on each beam, the beam with the best average signal strength may be noted and recorded as the AOA. For example, assume that beam 510 has the best average signal level, i.e., the center beam of the sequence. In this case wireless communications device 700, acting as STA A 100 will continue to switch beams in the same sequence for the next set of three bursts 351. If, however, the beam with the highest average signal strength is, or becomes beam 508, then wireless communications device 700, acting as STA A 100, may then select, in turn, beams 507, 509, 511, i.e., the beam sequence selection is shifted −15 degrees as depicted in FIG. 9. Similarly, if the beam with the highest average signal strength is, or becomes beam 512, then the wireless communications device 700, acting as STA A 100, may then select, in turn, beams 509, 511, 513, i.e., the beam selection sequence is shifted +15 degrees as depicted in FIG. 10. This selection sequence scheme of changing by zero, +15 or −15 degrees, continues. If, continuing this example, the highest average signal strength is, or then becomes beam 513, then the wireless communications device, acting as STA A 100, may then select, in turn, beams 510, 512, 514, i.e., the beam sequence selection further shifted +15 degrees. By this example method, after each selection of three beams, transmitting a burst 351 on each beam, the beam with the maximum averaged signal strength is reported as the AOA corresponding to the direction of STA B 105 from STA A 100.

The antenna selection sequence described above is -30, middle (0), +30 degrees, shifting plus or minus 15 degrees if the outer antennas have the better signal strength. Other selection sequences are possible, for example the antenna selection sequence may be middle, −30, middle +30. This scheme however would output the AOA every 4 bursts 351 and assumes that the middle antenna is the most likely selection. A scheme that switched between just two antennas is also possible but such a scheme may not find the best antenna in certain situations. The three antenna selection scheme described above is a preferred scheme.

The antenna selection sequence described above corresponds to example SBA 400 comprising 24 antennas as depicted in FIG. 5. As will be appreciated by one of skill in the art, the details of the SBA, i.e., the number of antennas and the beamwidths, may vary, but the basic described antenna beam selection sequence may still apply. For example, wide beam widths may be selected in turn, and then the individual beams in the wide beam with the highest received signal strength are selected, in turn. Then, based upon whether the middle or an outer antenna beam had the best received signal strength, the next antenna selection is shifted. For example, if the SBA comprised, say, of 12 antennas, then a wide beam formed by three adjacent antennas would be in the order of 90°. In this example, the antenna selection sequence is also −30, middle (0), +30 degrees, but shifting plus or minus 30 degrees if the outer antennas have the better signal strength.

Figure 11:
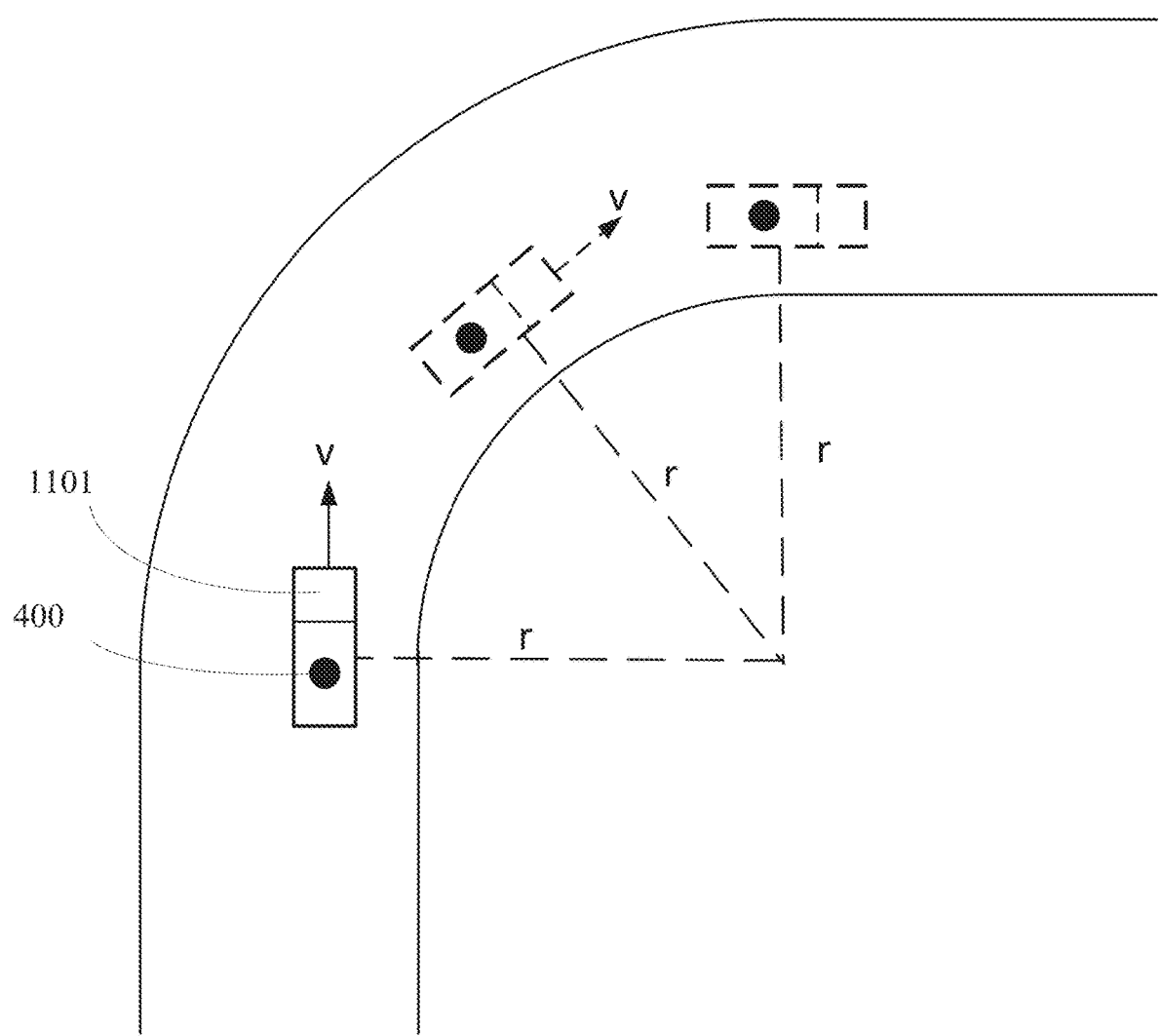
FIG. 11 is a diagram depicting vehicle that is turning a 90° corner of radius r, at a velocity v.

FIG. 11 is a diagram depicting vehicle 1101, that is turning a 90° corner of radius r, at a velocity v. A wireless communications device 700 is contained in vehicle 1101 with the SBA 400 mounted on or in vehicle 1101. The g force exerted on the vehicle 1101 is:

$$g\ force = \frac{v^2}{r} \quad (1)$$

The distance d travelled in completing the corner, 90°, is $$d = \frac{\pi r}{2} \quad (2)$$

and the time t to complete the corner, 90°, is $$t = \frac{d}{v} \quad (3)$$

The angular velocity V is therefore, $$V = \frac{90}{t} \quad (4)$$

Figure 1:
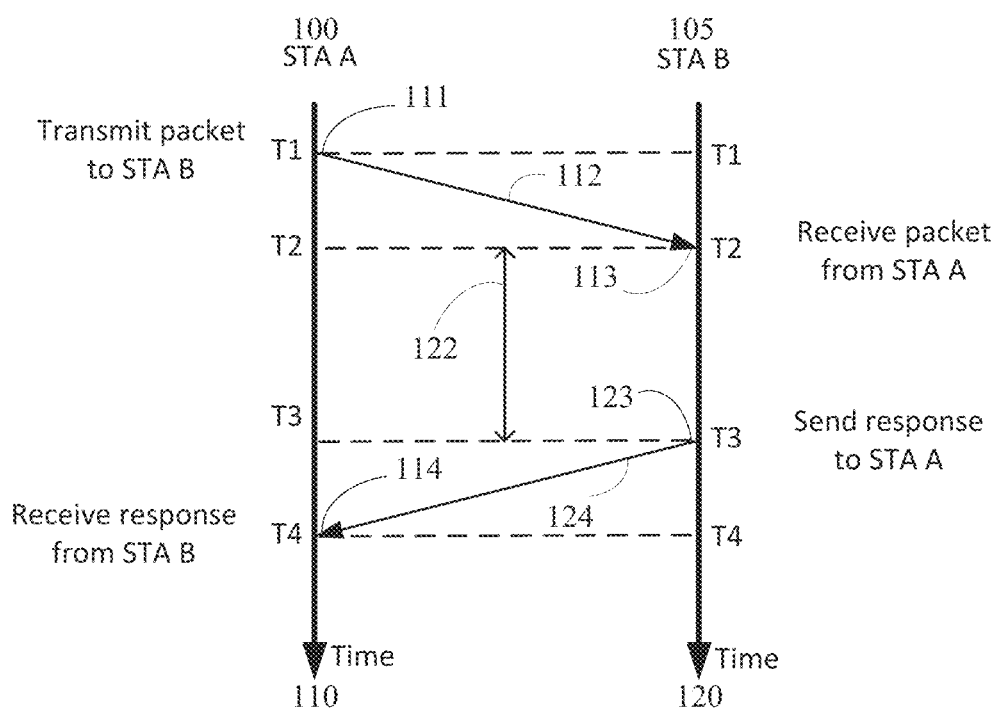
FIG. 1 is a diagram that describes a method of the present disclosure that may be used to communicate between two wireless devices, such as wireless device STA A and wireless device STA B.
Figure 2:
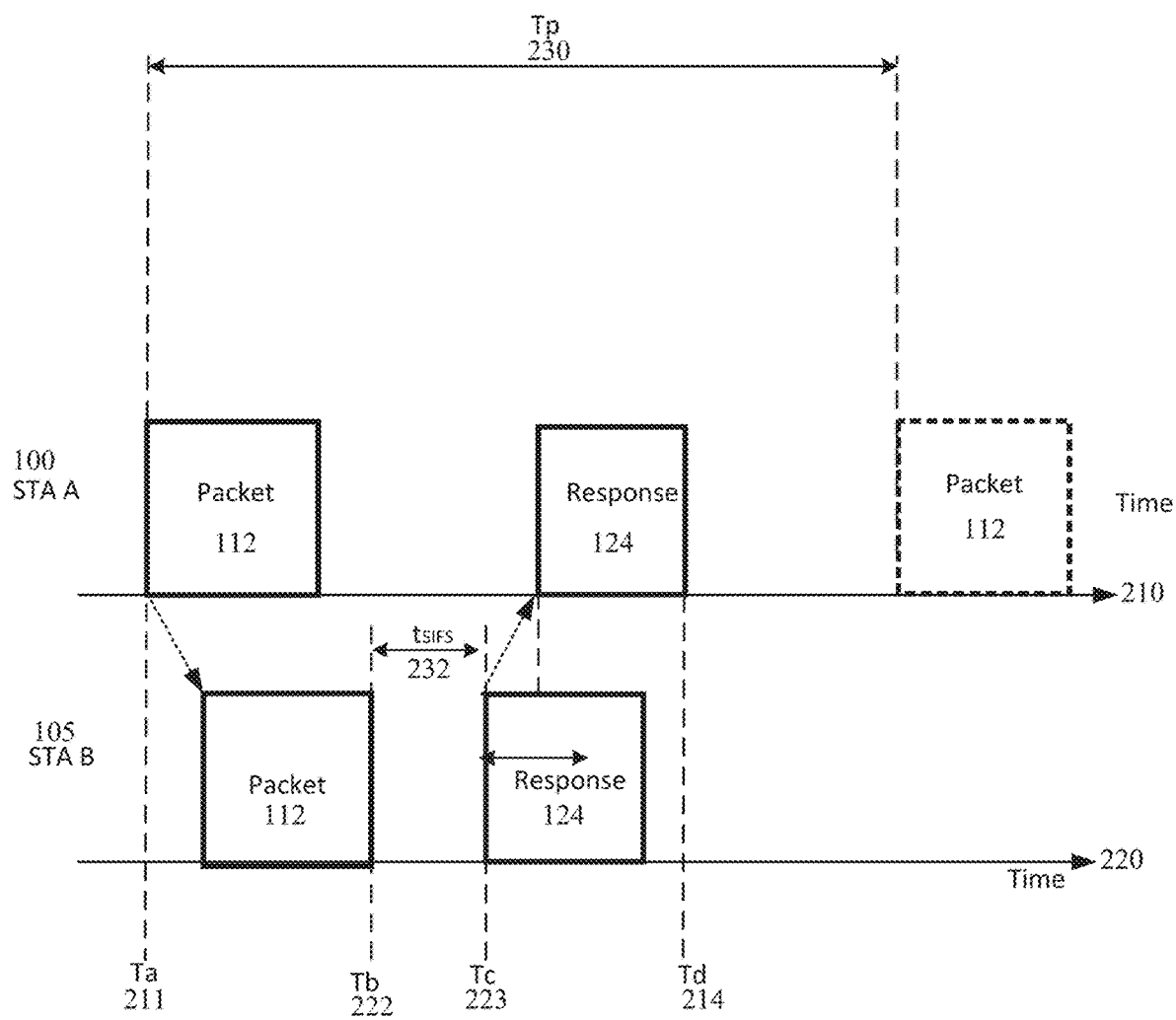
FIG. 2 is a diagram that describes in further detail the communication between STA A and STA B.

With reference to FIGS. 2 and 3, the duration of a burst 351 of N ranging packets 112, is N Tp, with a wait time Tw 371 between bursts. Hence, the time T to complete the sequence of three antenna selections, as described above, is:

$$T = 3(NTp + Tw) \quad (5)$$

In the time T to complete the antenna selection sequence, the vehicle 1101 will have changed its heading angle A, by, $$\Delta A = TV = \frac{180vT}{\pi r} \quad (6)$$

This angle ΔA may be considered the "error angle" due to the cornering of vehicle 1101.

As may be appreciated by one of skill in the art, it may be possible to use the platform location module 760 to compensate for changes in the heading due to the vehicle 1101 turning a corner. In this case the SBA 400 antenna selection would need to be adjusted as vehicle 1101 was turning. This may introduce timing errors as well as computational complexity. If, as in the example of a 24 beam SBA, the angular error A may be kept under half the beam selection accuracy, i.e., 7.5°, then the beam selection may effectively keep up with vehicle 1101 turning a corner.

Figure 12:
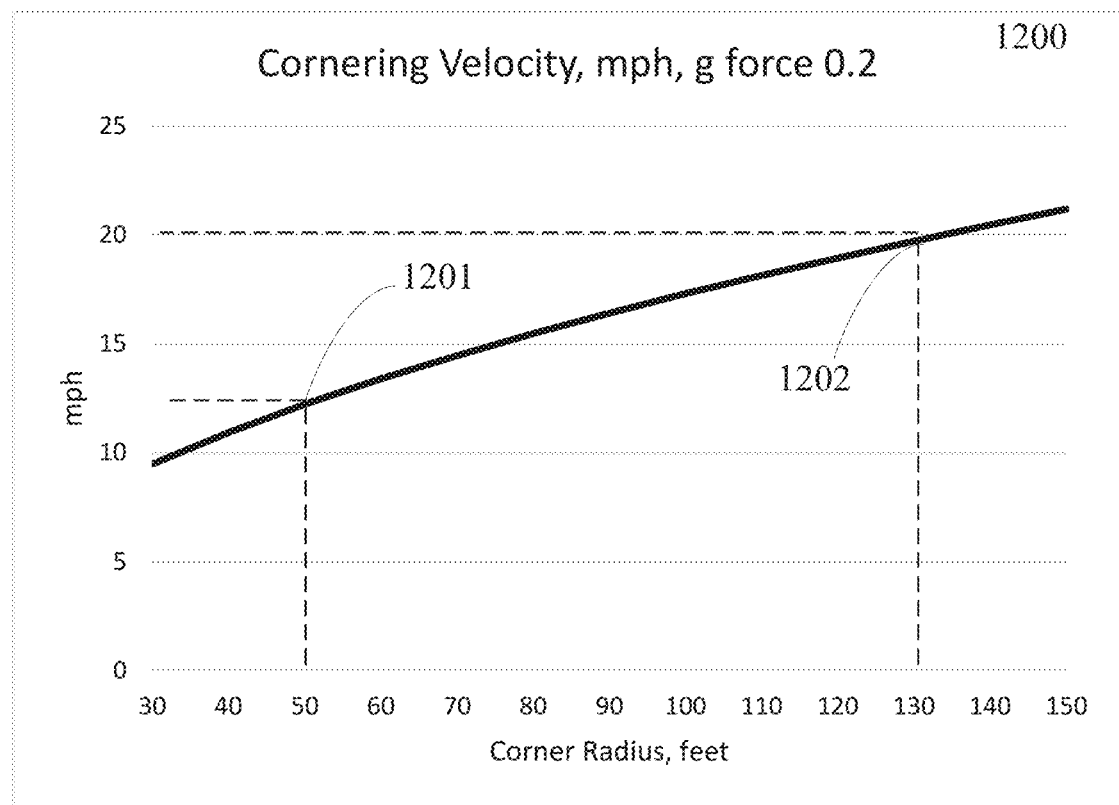
FIG. 12 is a graph of the velocity v, in mph, of a vehicle taking a corner at a g force of 0.2, for varying corner radii, r.

A maximum 'comfortable' g force for a vehicle turning a corner is in the order of 0.2 g. Typical corner radii, r, may range from about 30 feet up to 150 feet for various roads. FIG. 12 is a graph 1200 of the velocity v, in mph, of a vehicle 1101 taking a corner at a g force of 0.2, for varying corner radii, r. For example, for a corner radius r of 50 feet, vehicle 1101 would travel at a velocity v of 12 mph 1201 in order to exert a g force of 0.2, whereas for a corner radius r of 130 feet, vehicle 1101 would travel at a velocity v of 20 mph 1202.

With reference to FIGS. 2 and 3, the duration of a burst 351 of N packets 112, is N Tp, with a wait time Tw 371 between bursts. Hence, the time T to complete the sequence of three antenna selections, as described above, is given by equation (5). The longer the burst time, N Tp, and the wait time, Tw, the better the averaging of the signal strengths but the angular error 4A will increase. As an example, a burst may consist of 128 or 64 transmissions of packets 212 from STA A 100, each transmission, say, 1 ms apart, followed by a wait period of, say, 20 m or 30 ms, after which another burst of 128 or 64 transmissions may be sent. In this example the duration of each burst will be either 128 ms or 64 ms and burst plus wait time will be between 84 and 158 ms.

Figure 13:
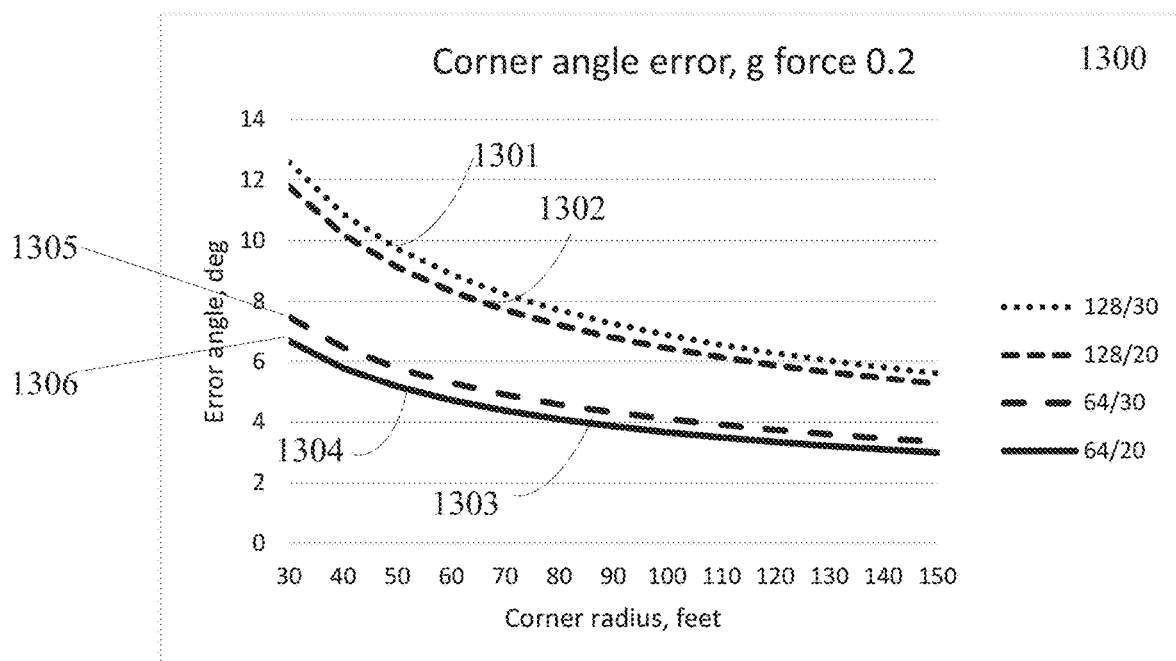
FIG. 13 is a graph of the angle error A due to cornering, for varying corner radii r, for vehicle cornering at a g force of 0.2 for varying burst and wait times.

FIG. 13 is a graph of the angle error A due to cornering, for varying corner radii r, for vehicle 1101 cornering at a g force of 0.2 for varying burst and wait times. Graph 1301 is for bursts of 128 ms and wait time 30 ms. Graph 1302 is for bursts of 128 ms and wait time 20 ms. Graph 1303 is for bursts of 64 ms and wait time 30 ms. Graph 1301 is for bursts of 64 ms and wait time 20 ms. The tighter the corner, i.e., the smaller the corner radius r, the higher the angle error 4A. For a 30 feet corner radius, the angle error 1305 is about 7.5° for bursts of 64 ms and wait time 30 ms, graph 1303, and the angle error 1306 is about 6.5° for bursts of 64 ms and wait time 20 ms, graph 1304. Hence, using bursts of 64 ms should enable the angular error A to be low enough such that the reported AOA may accurately follow the change in angle as vehicle 1101 turns corners. Averaging the signal strength over 64 packets will reduce the standard deviation of the signal strengths by a factor of $\sqrt{1/64}$. Hence, if the standard deviation of the signal strengths is, say, 3 dB, then after averaging, this is reduced to 0.375 dB.

Figure 14:
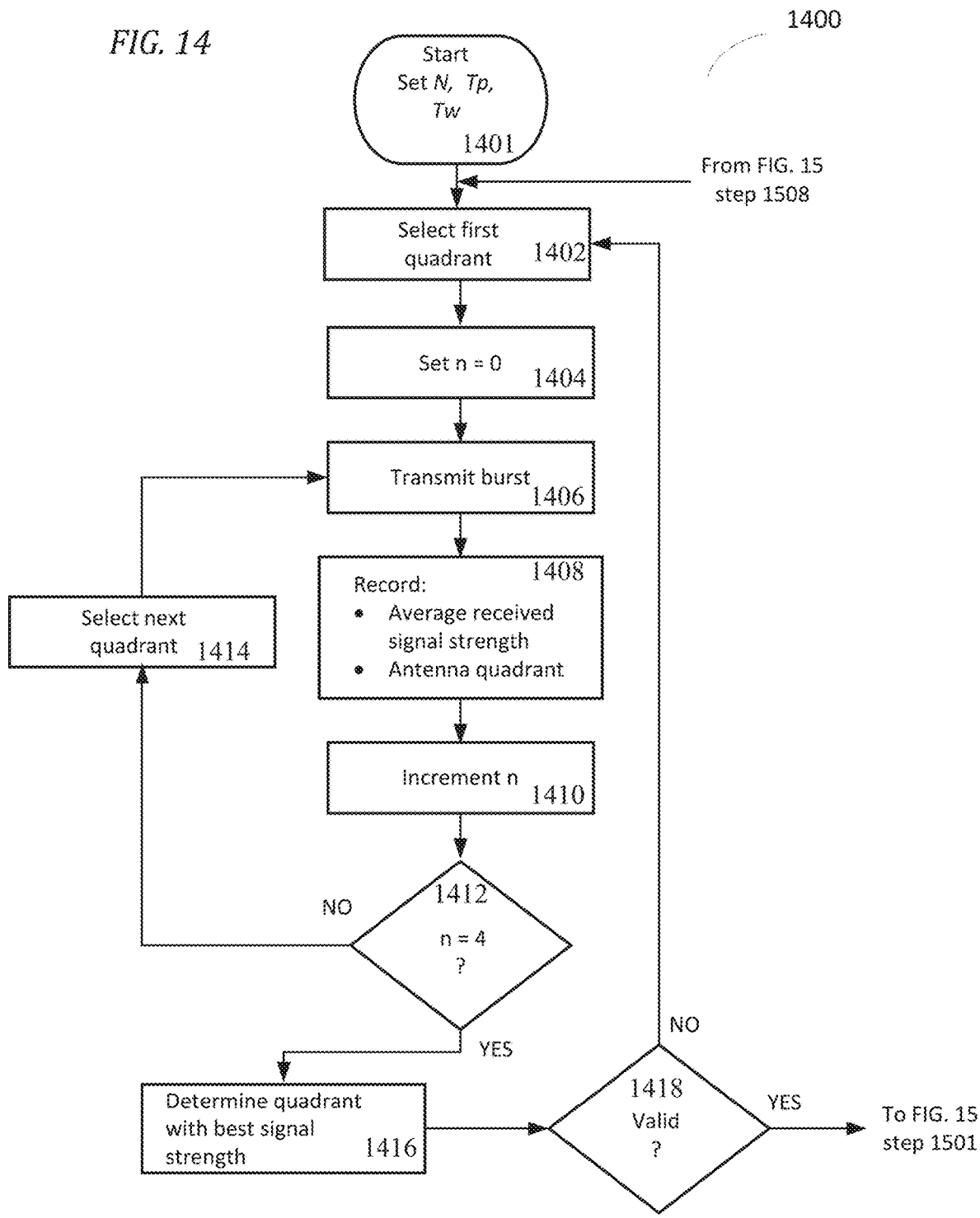
FIGS. 14 and 15 are a flow diagram of an example process of one embodiment of the disclosure for determining the AOA from a Wi-Fi device using a wireless communication device that includes an SBA.
Figure 15:
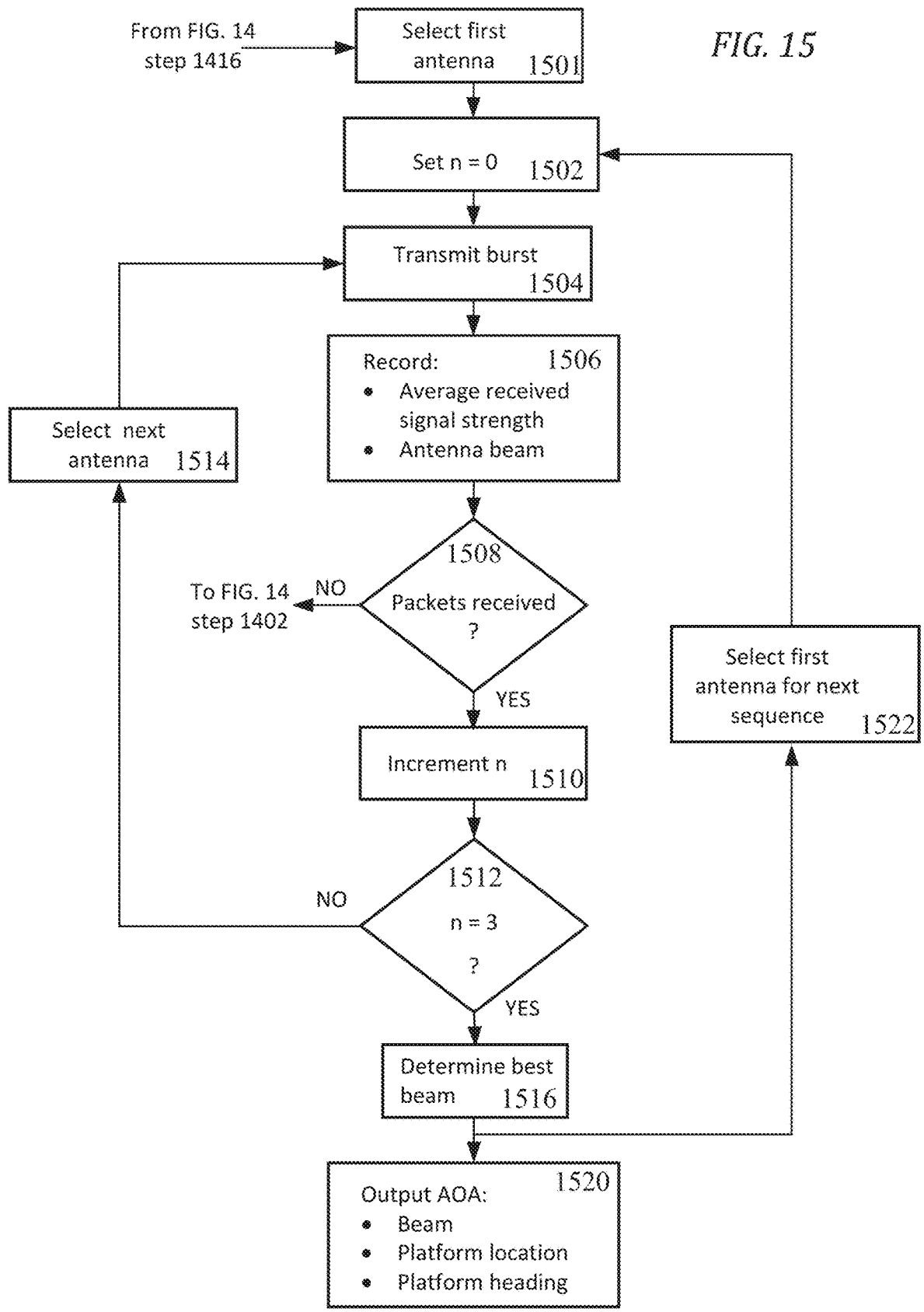

FIGS. 14 and 15 is a flow diagram of an example process 1400 of one embodiment of the disclosure for determining the AOA from a Wi-Fi device using a wireless communication device 700 that includes an SBA 400. Process 1400 may start at step 1401 where initial values for a number of parameters may be set. Such parameters may include N, the number of transmissions in a burst 351, Tp 230 the time between packets 112 transmitted in the burst 351, and Tw 371 the wait time between bursts. These values may be inputted by the user via general purpose processor 780 providing the values to processing circuitry 720 or may be preset via processing circuitry 720. Example values for N, Tp and Tw may be 64, 1 ms, and 20 ms, respectively.

At step 1402, an initial quadrant of the SBA 400 is selected, for example, quadrant 601. Any wide beam antenna may be selected by selecting the appropriate adjacent RF switches, as discussed above with reference to FIG. 4. The quadrant may be selected via data bus 790 and communications connector 480 under the control of processing circuitry 720. At step 1404, a variable n may be initialized and at step 1406, a burst 351 of N transmissions of ranging packet 112 are sent as described above with reference to FIG. 3. Ranging packets 112 are transmitted in burst 351 at intervals of Tp 230, as described above with reference to FIG. 2. At step 1408, the signal strengths of all response packets 124 received are averaged and recorded together with the corresponding antenna quadrant. The response packets 124 are received by wireless receiver 750 via SBA 400 and the signal strength may be determined by RF receiver 752 and recorded by processing circuitry 754. If the response packets 124 are received using correlator 753, then an equivalent signal strength related to the correlation may be recorded. At step 1410, variable n is incremented and at step 1412, a check if the value of n is 4 may be carried out. If n is not equal to 4, then at step 1414, the next quadrant of SBA 400 may be selected, and the process returns to step 1406 where another burst 351 of N transmissions of packet 112 are sent. If, at step 1412, n=4, then a burst 351 of N transmissions of packet 112 has been sent on all four quadrants, e.g., 601, 602, 603 and 604 and at step 1416, the quadrant with the best signal strength may be determined. At step 1418 a check may be made to determine that packets 214 have been received at step 1408, i.e., that the target STA 105 is within range. If packets have been received, then the process advances to FIG. 15, step 1501. If no packets have been received, then the process returns to step 1402.

Referring to FIG. 15, at step 1501, the first antenna in the quadrant with the best signal strength is selected. For example, if the quadrant with the best signal strength was quadrant 602, then, as described above with reference to FIG. 8, the three antennas that are selected to form that quadrant beam are 508, 510 and 512. In this example, at step 1501, the antenna supporting beam 508 would be selected. At step 1502, a variable n may be initialized and at step 1504 a burst 351 of N transmissions of packet 112 are sent, as described above with reference to FIG. 3. At step 1506, the signal strengths of all response packets 124 received are averaged and recorded together with the corresponding antenna beam. If the response packets 124 are received using correlator 753, then an equivalent signal strength related to the correlation may be recorded. At step 1508, a check is made to ensure that some packets are being received. If packets have been received at step 1506, then step 1508 may be followed by step 1510, where the variable n is incremented. A check on the value of n is then carried out at step 1512, and if n is less than 3, the next antenna beam is selected at step 1514 and the process returns to step 1504, where a new burst 351 of N transmissions of packet 112 are sent. In the example where quadrant 602 is selected at step 1416, then the selection sequence of antenna beams is 508, 510, and 512.

If, at step 1512, n=3, then a burst 351 of N transmissions of packet 112 has been sent on the three antenna beams. At step 1516, the antenna beam with the best signal strength may be determined and at step 1520, the AOA may be output. The AOA reported at step 1520 is relative to the heading of wireless communication system 700. In the general sense, assuming that wireless communication system 700 is mounted in an automotive vehicle, then SBA 400 would be mounted, either internally or on the roof, with the zero degree beam 601 in the forward direction of the vehicle. Then the AOA, relative to north, recorded at step 1520 would be the heading of the vehicle, as reported by platform location module 760, plus the SBA beam angle. Also, at step 1520, the location of wireless communication system 700 is reported. The location is provided by platform location module 760. General purpose processor 780 may include a display that indicates a vector showing the instantaneous direction of target STA B 105 relative to wireless communications system 700, i.e., the AOA outputted at step 1520 corrected by the heading.

The process continues via step 1522 where the first antenna for the next sequence of antenna beam selection takes place. As discussed above with reference to FIGS. 8, 9 and 10, the best beam is determined at step 1516. If the center beam was the strongest, then the same antenna sequence is repeated. If the −30° antenna was the strongest, then the antenna sequence is shifted −15°, and if the +30° antenna was the strongest then the antenna sequence is shifted +15°. Hence, after three bursts 351, transmitted on each of the three antennas spaced at 30°, an AOA is output together with the location of wireless communication system 700. The location of the target 105 may then be calculated. The determination of a target location using AOA at a moving station is known. As discussed above with reference to FIGS. 11, 12, and 13, by selecting appropriate values for N, Tp 230 and Tw 371, then even when the vehicle containing wireless communications system 700 is turning corners, the reported AOA is accurate.

At step 1508 it may be determined if the target 105 is out of range. For example, if no response packets 214 are received at step 1506 for a pre-determined period, then the process 1400 may return to step 1402.

Figure 16:
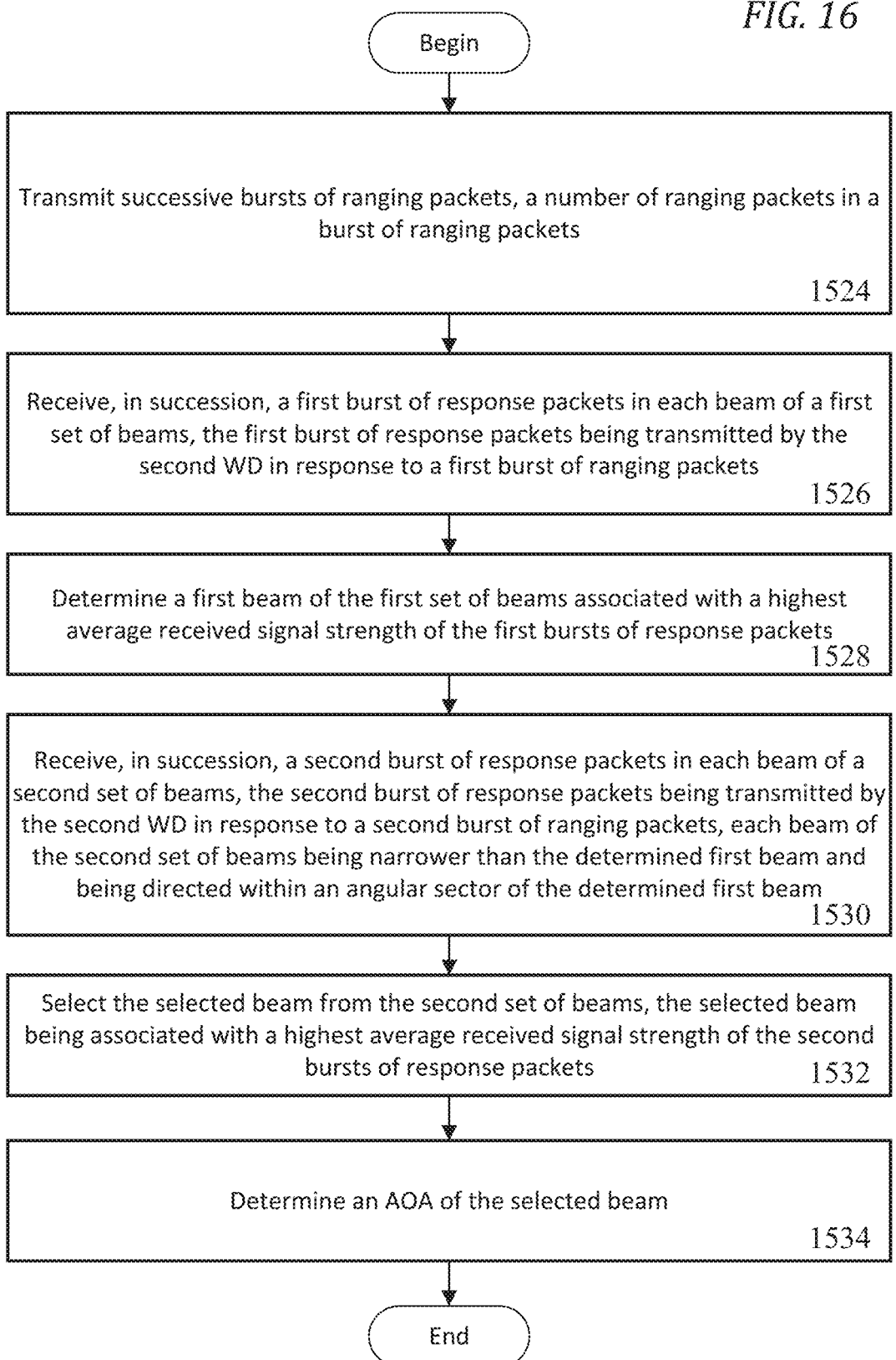
FIG. 16 is a flow diagram of an example process in a WD for determining an AOA of beam selected based on average received signal strengths of ranging packets.

FIG. 16 is flow diagram of a process in a first wireless device (WD) 100 configured with a switched beam antenna (SBA 400), for determining an angle of arrival (AOA) corresponding to communication between first WD 100 and a second WD 105, the process being performed by the SBA 400, the RF transmitter 711, the RF receiver 752, processing circuitry 720 and processing circuitry 754. The process includes transmitting successive bursts of ranging packets, a number of ranging packets in a burst of ranging packets, a time between ranging packets in the burst and a gap between successive bursts being selected based at least in part on a first limit on an angular error of a determination of an AOA of a selected beam (step 1524). The process also includes receiving, in succession, a first burst of response packets in each beam of a first set of beams, the first burst of response packets being transmitted by the second WD 105 in response to a first burst of ranging packets (step 1526). The process also includes determining a first beam of the first set of beams associated with a highest average received signal strength of the first bursts of response packets (step 1528). The process further includes receiving, in succession, a second burst of response packets in each beam of a second set of beams, the second burst of response packets being transmitted by the second WD 105 in response to a second burst of ranging packets, each beam of the second set of beams being narrower than the determined first beam and being directed within an angular sector of the determined first beam (step 1530). The process further includes selecting the selected beam from the second set of beams, the selected beam being associated with a highest average received signal strength of the second bursts of response packets (step 1532). The process also includes determining an AOA of the selected beam (step 1534).

In some embodiments, the number of ranging packets in the burst of ranging packets, the time between ranging packets in the burst and the gap between successive bursts of ranging packets are selected further based on a second limit on an error in determining a highest average received signal strength of a burst of response packets. In some embodiments, receiving, in succession, a second burst of response packets in each beam of the second set of beams includes: receiving, in succession, a burst of response packets in each beam of a first subset of the second set of beams; and receiving, in succession, a burst of response packets in each of at least one beam of a second subset of the second set of beams, the at least one beam of the second subset being offset in direction from a direction of a beam of the first subset. In some embodiments, the offset in direction is selected based at least in part on the limit on an angular error in determining the AOA of the selected beam. In some embodiments, the first subset of the second set of beams are directed in a first set of directions within the angular sector and the offset in direction is selected to be in a direction of increasing average received signal strength as determined based at least in part on average received signal strengths associated with beams of the first subset of the second set of beams. In some embodiments, the first subset of the second set of beams are associated with a first set of antennas of the first WD 100 and the second subset of the second set of beams are associated with a subset of the first set of antennas. In some embodiments, a direction of each beam of a subset of the second set of beams is successively incremented in an angular direction, until an average received signal strength of an associated beam of the subset exceeds a threshold. In some embodiments, an average received signal strength is based at least in part on a correlation of a received response packet with a known sequence. In some embodiments, the first WD 100 is positionable on a vehicle and the first WD 100 is configured to select the number of ranging packets in a burst of ranging packets, the time between ranging packets in the burst and the gap between successive bursts based at least in part on a velocity of the vehicle. In some embodiments, a time between ranging packets in the burst and a gap between successive bursts is selected based at least in part on a limit on angular error of a determination of an AOA of a selected beam. In some embodiments, the limit on angular error is less than half a beam selection accuracy of the SBA 400.

As will be appreciated by one of skill in the art, the details of the SBA, i.e., the number of antennas and the beamwidths, may vary, but the described antenna beam selection sequence still applies. For example, wide beam widths may be selected in turn, and then the individual beams in the wide beam that had the highest received signal strength are selected, in turn. If the antenna with the highest received signal strength is not the middle antenna, then the sequence shifts by one antenna in the same direction.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that may be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of transmissions in a burst, the time between transmissions within a burst, the wait time between bursts, the number of antennas in the SBA, the beam widths of the antennas in the SBA. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first wireless device (WD) configured with a switched beam antenna (SBA), for determining an angle of arrival (AOA) corresponding to communication between the first WD and a second WD, the method comprising:
   identifying a first beam having a first width and a sector of beam coverage from which the first WD transmits ranging packets and the second WD returns response packets, the sector of beam coverage of the first beam comprising a plurality of second beams pointing in different directions, each second beam being narrower than the first beam;
   transmitting in succession, via the first WD, a burst of ranging packets on each second beam;
   for each transmission on a second beam:
      receiving a burst of response packets transmitted by the second WD in response to the burst of ranging packets;
      comparing each received response packet to a reference sequence to generate a plurality of correlation values corresponding to the burst of response packets; and
      determining a first metric value based on the plurality of correlation values so that each second beam in the plurality of second beams is associated with a corresponding first metric value;

selecting a second beam from the plurality of second beams with a corresponding highest one of the first metric values; and determining an AOA for the selected second beam.

2. The method of claim 1, wherein at least one of (i) a number of ranging packets in the burst of ranging packets, (ii) a time between ranging packets in the burst, and (iii) a gap between successive bursts of ranging packets is selected based on a limit on an error in determining the highest one of the first metric values.

3. The method of claim 1, wherein receiving the bursts of response packets transmitted by the second WD includes:

receiving, in succession, a burst of response packets in each beam of a first subset of the plurality of second beams; and receiving, in succession, a burst of response packets in each of at least one beam of a second subset of the plurality of second beams, the at least one beam of the second subset being offset in direction from a direction of a beam of the first subset.

4. The method of claim 3, wherein the offset in direction is selected based at least in part on a limit on an angular error in determining the AOA for the selected second beam.

5. The method of claim 3, wherein the first subset of the plurality of second beams are directed in a first set of directions and the offset in direction is selected to be in a direction of increasing first metric value as determined based at least in part on the first metric values associated with beams of the first subset of the plurality of second beams.

6. The method of claim 3, wherein the first subset of the plurality of second beams are associated with a first set of antennas of the first WD and the second subset of the plurality of second beams are associated with a subset of the first set of antennas.

7. The method of claim 1, wherein a direction of each beam of a subset of the plurality of second beams is successively incremented in an angular direction until the first metric value of an associated beam of the subset exceeds a threshold.

8. The method of claim 1, wherein the first WD is positioned on a vehicle and configured to select at least one of (i) a number of ranging packets in a burst of ranging packets, (ii) a time between ranging packets in the burst, and (iii) a gap between successive bursts based at least in part on a velocity of the vehicle.

9. The method of claim 1, wherein a time between ranging packets in the burst and a gap between successive bursts is selected based at least in part on a limit on angular error in determining the AOA of the selected second beam.

10. The method of claim 9, wherein the limit on angular error is less than half a beam selection accuracy of the SBA.

11. A first wireless device (WD) configured with a switched beam antenna (SBA), for determining an angle of arrival (AOA) corresponding to communication between the first WD and a second WD, the first WD comprising:

processing circuitry configured to identify a first beam having a first width and a sector of beam coverage from which the first WD transmits ranging packets and the second WD returns response packets, the sector of beam coverage of the first beam comprising a plurality of second beams pointing in different directions, each second beam being narrower than the first beam;

an RF transmitter configured to transmit, in succession, a burst of ranging packets on each second beam; and an RF receiver configured to receive, for each transmission on a second beam, a burst of response packets transmitted by the second WD in response to the burst of ranging packets;

wherein the processing circuitry is further configured to:
for each transmission on a second beam:

compare each received response packet to a reference sequence to generate a plurality of correlation values corresponding to the burst of response packets; and determine a first metric value based on the plurality of correlation values so that each second beam in the plurality of second beams is associated with a corresponding first metric value;

select a second beam from the plurality of second beams with a corresponding highest one of the first metric values; and determine an AOA for the selected second beam.

12. The first WD of claim 11, wherein at least one of (i) a number of ranging packets in the burst of ranging packets, (ii) a time between ranging packets in the burst, and (iii) a gap between successive bursts of ranging packets is selected based on a limit on an error in determining the highest one of the first metric values.

13. The first WD of claim 11, wherein to receive by the RF receiver the bursts of response packets transmitted by the second WD comprises:

receiving, in succession, a burst of response packets in each beam of a first subset of the plurality of second beams; and receiving, in succession, a burst of response packets in each of at least one beam of a second subset of the plurality of second beams, the at least one beam of the second subset being offset in direction from a direction of a beam of the first subset.

14. The first WD of claim 13, wherein the offset in direction is selected based at least in part on a limit on an angular error in determining the AOA for the selected second beam.

15. The first WD of claim 13, wherein the first subset of the plurality of second beams are directed in a first set of directions and the offset in direction is selected to be in a direction of increasing first metric value as determined based at least in part on the first metric values associated with beams of the first subset of the plurality of second beams.

16. The first WD of claim 13, wherein the first subset of the plurality of second beams are associated with a first set of antennas of the first WD and the second subset of the plurality of second beams are associated with a subset of the first set of antennas.

17. The first WD of claim 11, wherein a direction of each beam of a subset of the plurality of second beams is successively incremented in an angular direction until the first metric value of an associated beam of the subset exceeds a threshold.

18. The first WD of claim 11, wherein the first WD is positioned on a vehicle and configured to select at least one of (i) a number of ranging packets in a burst of ranging packets, (ii) a time between ranging packets in the burst, and (iii) a gap between successive bursts based at least in part on a velocity of the vehicle.

19. The first WD of claim 11, wherein a time between ranging packets in the burst and a gap between successive bursts is selected based at least in part on a limit on angular error in determining the AOA of the selected second beam.

20. The first WD of claim 19, wherein the limit on angular error is less than half a beam selection accuracy of the SBA.

\* \* \* \* \*